(12) United States Patent
Cetinkaya et al.

(10) Patent No.: US 8,696,073 B2
(45) Date of Patent: Apr. 15, 2014

(54) METHOD FOR OPERATING A HYDRAULICALLY WORKING BRAKE SYSTEM, AND BRAKE SYSTEM

(75) Inventors: Ferah Cetinkaya, Ilsfeld (DE); Stephan Stabrey, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 316 days.

(21) Appl. No.: 12/962,130

(22) Filed: Dec. 7, 2010

(65) Prior Publication Data

US 2011/0140508 A1   Jun. 16, 2011

(30) Foreign Application Priority Data

Dec. 8, 2009 (DE) .................... 10 2009 047 622

(51) Int. Cl.
*B60T 8/88* (2006.01)
*B60T 8/96* (2006.01)

(52) U.S. Cl.
USPC .................. 303/122.03; 303/122.09; 303/191

(58) Field of Classification Search
USPC ............ 303/122, 122.09, 122.1, 122.15, 191, 303/193, 43
See application file for complete search history.

(56) References Cited

U.S. PATENT DOCUMENTS

| | | | | |
|---|---|---|---|---|
| 5,722,744 A | * | 3/1998 | Kupfer et al. | 303/189 |
| 5,902,020 A | * | 5/1999 | Drott | 303/122.09 |
| 8,191,667 B2 | * | 6/2012 | Stabrey | 180/275 |
| 2008/0234909 A1 | * | 9/2008 | Iwasaki et al. | 701/70 |

FOREIGN PATENT DOCUMENTS

DE    102007025960 A1 * 12/2008

* cited by examiner

*Primary Examiner* — Anna Momper
(74) *Attorney, Agent, or Firm* — Kenyon & Kenyon LLP

(57) ABSTRACT

A method for operating a hydraulically working brake system of a vehicle, in particular a motor vehicle, having at least one brake line assigned to at least one wheel brake, the brake line being connected or connectable via a switchable valve to the high pressure side of a pump unit for brake fluid. It is provided that the valve is closed when an unexpected pressure drop is detected in the brake line. Also described is a brake system for a vehicle, in particular a motor vehicle.

15 Claims, 2 Drawing Sheets

Fig. 1

METHOD FOR OPERATING A HYDRAULICALLY WORKING BRAKE SYSTEM, AND BRAKE SYSTEM

RELATED APPLICATION INFORMATION

The present application claims priority to and the benefit of German patent application no. 10 2009 047 622.9, which was filed in Germany on Dec. 8, 2009, the disclosure of which is incorporated herein by reference.

FIELD OF THE INVENTION

The present invention relates to a method for operating a hydraulically working brake system of a vehicle, in particular a motor vehicle, having at least one brake line assigned to at least one wheel brake, the brake line being connected or connectable via a switchable valve to the high pressure side of a pump unit for brake fluid. The present invention also relates to a brake system for a vehicle, in particular a motor vehicle, in particular for carrying out the above method, having at least one brake line assigned to at least one wheel brake, the brake line being connected or connectable via a switchable valve to the high pressure side of a pump unit for brake fluid.

BACKGROUND INFORMATION

Methods and brake systems of the type named at the beginning are known from the related art. Hydraulically working brake systems apply a working pressure to wheel brakes, which is generated by a pump unit and transmitted via the brake fluid. Pump unit in this connection refers to any arrangement that is able to make a (fluid) pressure available, such as in particular dynamic or displacement pumps, for example piston or vane pumps, or also (master) brake cylinders or pressure accumulators. The brake fluid is transported through a brake line to the wheel brake. Between the wheel brake and the pump unit a valve is provided in the brake line which is operated to activate the wheel brake, in order to operate the wheel brake with the aid of the pressure generated by the pump unit.

If the brake line is damaged, for example by an accident, the brake fluid is able to escape from the hydraulic system. In the worst case, so much brake fluid escapes that it is not possible to build up sufficient pressure to initiate brake application.

SUMMARY OF THE INVENTION

The exemplary embodiments and/or exemplary methods of the present invention provides for the valve to be closed when an unexpected pressure drop in the brake line is detected. The pressure drop is used as a clear indication of damage to the brake line and a subsequent escape of brake fluid. An unexpected pressure drop also refers to the case in which it is not possible to build up any pressure in the brake line. If the pressure unexpectedly drops off sharply, or if it is not possible to build up any pressure, this signifies damage to the brake line, and the valve is closed so that a further escape of brake fluid that is being conveyed into the brake line by the pump unit is prevented. In a brake system having a plurality of brake lines that lead to different wheel brakes of the vehicle, this has the benefit that a pressure loss which could affect the entire hydraulic system is prevented, and it is possible to maintain the operation of the remaining wheel brakes and brake lines. As a result, it is still possible to initiate brake application, even if one of the brake lines is damaged, increasing the overall safety of the vehicle. The valve may be an existing inlet valve of the brake system, or else a separately provided emergency valve.

Advantageously, to detect an unexpected pressure drop the pressure in the brake line is ascertained, in particular with the aid of a pressure sensor, and is compared to an expected pressure. The pressure sensor may be situated at any desired location on the brake line, or even in a line section of the wheel brake or of the pump unit, as long as the pressure in the line section corresponds to the pressure in the brake line. By preference, the pressure sensor is situated upstream from the valve, seen from the pump unit. In that way, after the valve has been closed it is still possible to ascertain the pressure between the valve and the high pressure side of the pump unit, in order to rule out any other cause for the pressure drop other than damage to the brake line, in particular in proximity to the wheel brake. In principle the method may be carried out at any time, and advantageously whenever a brake application is initiated.

The expected pressure is advantageously determined as a function of the capacity of the pump unit. Thus it is possible to calculate and/or estimate the pressure to be expected in the intact brake line from the volume of brake fluid delivered by the pump unit. By comparing the expected pressure to the pressure actually present in the brake line, it is thus possible to detect a pressure drop quickly. Limiting values are advantageously predefined here which must exceed the ascertained pressure difference between the expected pressure and the existing pressure, before an unexpected pressure drop is diagnosed.

Alternatively or in addition, it is provided that for detecting an unexpected pressure drop the instantaneous actual power consumption of the pump unit is compared to an expected set-point power consumption. To this end a counterpressure-power consumption characteristic may be stored in a memory, which gives the typical power consumption of the pump unit during the active pressure buildup (with the brake line intact). If a brake line is defective, the pressure in the brake line decreases, as does the counterpressure which acts upon the pump unit. This results in the pump unit needing less electric current. Thus it is possible to deduce the presence of a defect in a brake line on the basis of unexpectedly low pump current.

Advantageously, when a plurality of brake lines is present, to detect an unexpected pressure drop in one of the brake lines the valve of that brake line is opened and the valves of the other brake lines are closed. By closing the valves of the other brake lines, the influences acting on the brake line to be tested are reduced, so that a detected pressure drop may be assigned clearly to the one brake line. In this way it is possible to test all of the brake lines of the brake system one after the other. Naturally, a plurality of brake lines of the brake system may also be combined into one brake circuit, in which case the brake lines of a brake circuit are then advantageously switched by a shared valve. While this simplifies the design, it does reduce the accuracy of the method, since as a result it is then only possible to deduce the pressure drop in one brake circuit and not in one individual brake line. Naturally, a separate emergency valve may also be assigned to each brake line within the respective brake circuit, which takes action only when an unexpected pressure drop is detected.

An advantageous refinement of the method provides that a suspicious brake line is selected from the plurality of brake lines (or brake circuits) prior to detection of an unexpected pressure drop. In order to speed up the method, a suspicious brake line is first determined, meaning that a brake line is selected about which it is assumed that a defect could be present. That brake line is then the first to be checked for its functioning, as described above.

The suspicious brake line is advantageously selected as a function of data from a collision detection system of the vehicle. The collision detection system may be a component of a restraint system that includes safety devices such as belt tensioners, airbags, or an ESP system. Besides simply detecting a collision, modern collision detection systems may also detect or determine the point of impact on the vehicle. This makes it possible to ascertain, on the basis of the data collected by the collision detection system, whether there could be a defect in one of the wheel brakes and/or wheel brake lines, and if so, in which one. In particular after an accident it is then possible to conclude, for example, if a wheel has become detached, at what location brake fluid could escape from the hydraulic system. With the aid of the method described above, it is then possible to confirm the suspicion in a particularly simple way and to close the corresponding valve if necessary, so that a further escape of brake fluid is prevented.

It is also provided that when a collision of the vehicle is detected by the collision detection system, an automatic brake application is triggered. That ensures that the vehicle is brought to a stop as quickly as possible after an accident, in order to prevent subsequent accidents. It is important in this particular case that a defective brake line be detected as quickly as possible, since when an automatic brake application is triggered the brake pressure in the wheel brakes is automatically increased. If one of the brake lines is defective, then the brake fluid escapes from the hydraulic system even more quickly in this case, so that a long-term buildup of pressure at the remaining wheel brakes is no longer possible unless the appropriate valve is quickly closed, as described above.

The brake system according to the present invention is distinguished by an arrangement for detecting an unexpected pressure drop in the brake line and for closing the valve if an unexpected pressure drop is detected. This yields the benefits described above. The valve may be a normal control valve (inlet valve) for triggering the wheel brakes of the brake system, or it may be provided as a separate emergency valve.

The arrangement advantageously includes at least one pressure sensor assigned to the brake line or possibly to the brake circuit, a device for ascertaining the power consumption of the pump unit, and/or a collision detection system. With the aid of the collision detection system, which is advantageously a component of a restraint system that includes at least one airbag, it is possible in the event of a collision to localize which wheel brake or which brake line of the brake system might have been damaged. With the aid of the pressure sensor assigned to the brake line, it is possible to determine the brake fluid pressure in the particular brake line in a simple manner and to compare it to an actually expected pressure in the brake line. The data from the pressure sensor may be compared in a control unit, for example, to the expected data, which may be based on the capacity of the pump unit and/or are estimated on the basis of a stored model. Alternatively or in addition, the actual power consumption of the pump unit is ascertained with the aid of the described device and is compared to an expected setpoint power consumption of the pump unit, which is calculated, for example, from the capacity of the pump and an expected counterpressure. As already described earlier, a plurality of brake lines may be provided, which are possibly combined and divided into a plurality of different brake circuits.

The exemplary embodiments and/or exemplary methods of the present invention will now be explained in greater detail on the basis of the drawings.

DETAILED DESCRIPTION

Figure 1:
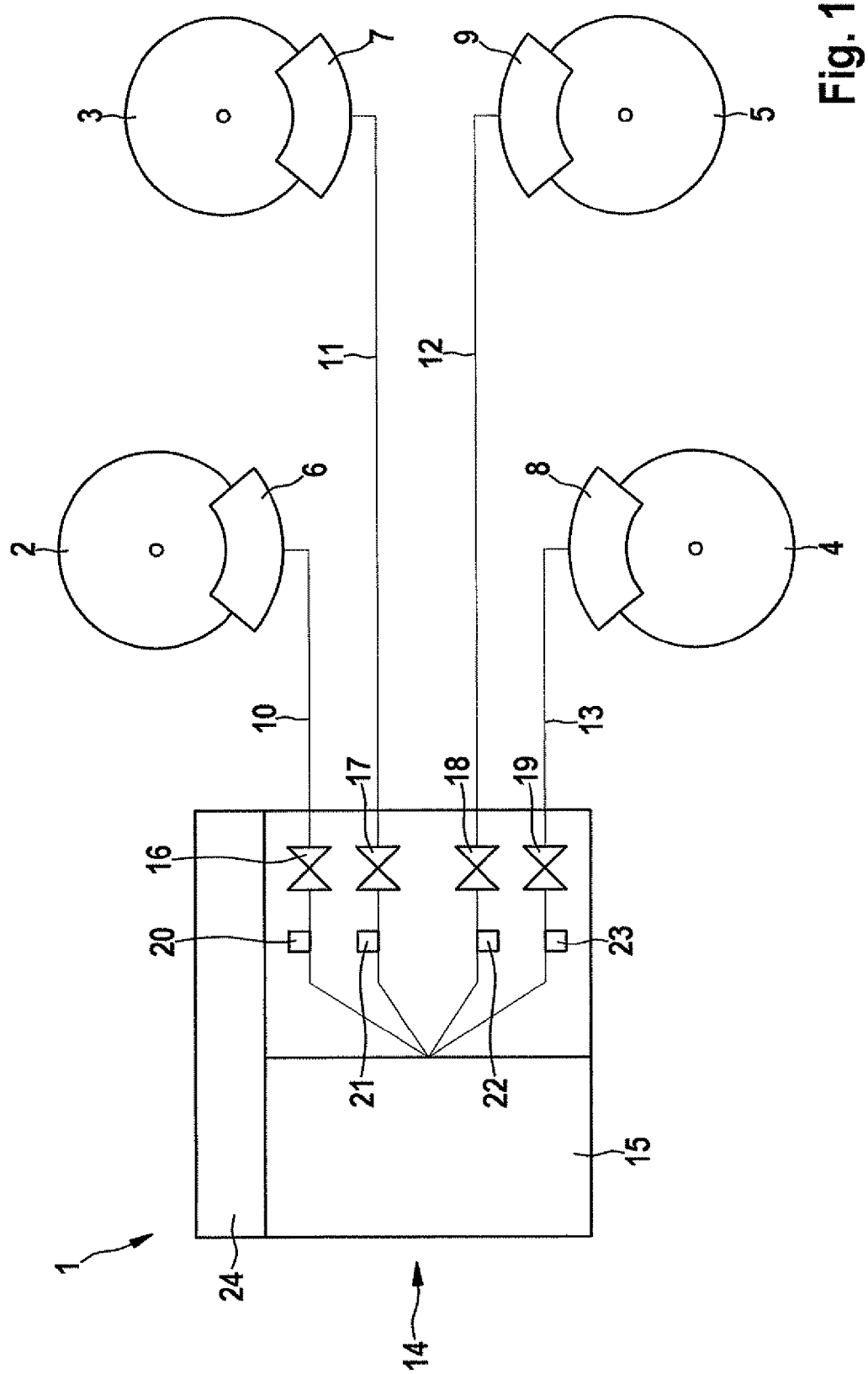
FIG. 1 shows a brake system of a motor vehicle in a simplified depiction.

FIG. 1 shows, in a greatly simplified depiction, a brake system 1 of a motor vehicle (not depicted in further detail here), which has four wheels 2, 3, 4 and 5, to each of which is assigned a wheel brake 6, 7, 8 and 9 of brake system 1. Wheel brakes 6 through 9 are each connected via a brake line 10, 11, 12 and 13 to a braking unit 14.

Braking unit 14 includes a pump unit 15, to whose high pressure side brake lines 10, 11, 12, 13 are connected. Assigned to each of brake lines 10 through 13 is a switchable valve 16, 17, 18 and 19, via which the respective brake line 10 through 13 or the respective wheel brake 6 through 9 is connectable or connected to the high pressure side of pump unit 15. Valves 16 through 19 in the present case are control valves (inlet valves), via which wheel brakes 6 through 9 may be activated. Return lines, which are advantageously part of the hydraulic system of brake system 1 depicted here, are not shown for reasons of clarity. Valves 16 through 19 may alternatively also be provided or designed as additional non-emergency valves. Furthermore, a pressure sensor 20 through 23 is assigned to each of brake lines 10 through 13 for detecting the pressure of the brake fluid in the respective brake line 10 through 13. Pressure sensors 20 through 23 and valves 16 through 19 are advantageously situated in and/or on braking unit 14, and are connected to a control unit 24 of braking unit 14 via appropriate wiring. Control unit 24 is advantageously connected to a collision detection system (not shown in further detail here), which is advantageously a component of a restraint system of the motor vehicle. In the present exemplary embodiment, the collision detection system also includes an airbag control unit, which issues the signal "collision has occurred" in the event of a collision. After the plausibility of the signal has been verified via communication tests, control unit 24 initiates an automatic brake application which brakes the vehicle to a standstill, in order to prevent subsequent accidents after a collision, for example. The motor vehicle may also include an ESP system, which is able to initiate an automatic brake application without a collision having occurred.

In the initial collision there may be damage to one of brake lines 10 through 13, and/or in an extreme case one of wheels 2 through 5 may be torn off. When a wheel becomes detached, the monitoring algorithms of control unit 24, which is designed in particular as an ESP control unit (ESP=electronic stability program), may detect a so-called implausible wheel due to rotational speed sensor signals on wheels 2 through 5.

In a departure from the brake system depicted in FIG. 1, it is naturally also possible, for example, to combine two brake lines 10, 11 and 12, 13 into one brake circuit each, which is connected to the high pressure side of pump unit 15 via only one valve. The result of opening the valve is that the wheel is no longer braked. In the event of a detached wheel with damage to the brake line and detection of an implausible wheel, this would result in brake fluid being pumped from a reservoir of the hydraulic system into the environment, and subsequently after a certain time both wheels of the affected brake circuit could be braked with only a slight braking force or not at all. The advantageous brake system provides that in the event of a pressure loss in one of brake lines 10, 11, 12 or 13, the valve 16, 17, 18 or 19 assigned to that brake line is closed. That prevents brake fluid from escaping into the environment and the overall performance of the brake system being reduced. At least there is assurance that the wheels having intact brake lines may also continue to be braked optimally. If one of brake lines 10 through 13, for example, is damaged, the wheel brakes of the remaining brake lines may continue to be operated optimally.

Figure 2:
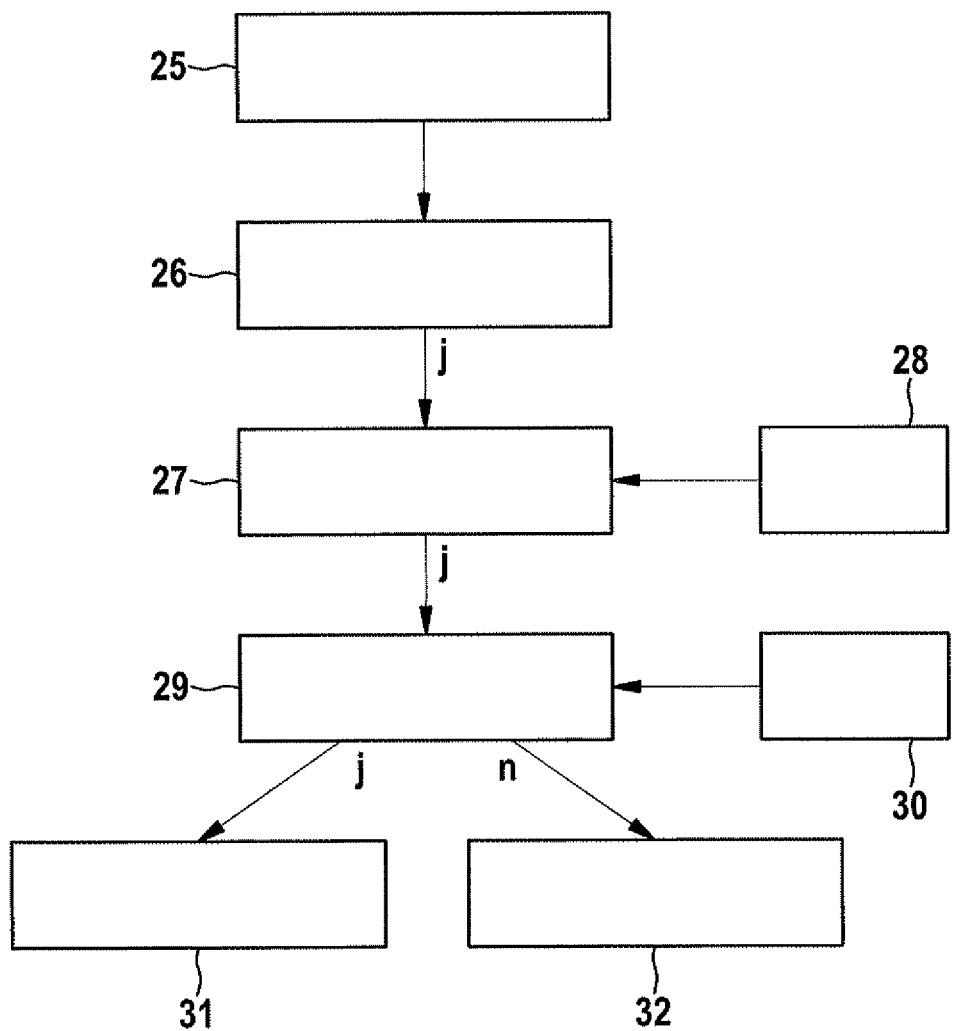
FIG. 2 shows an advantageous method for operating the brake system, depicted in a flow chart.

In the following section, the advantageous method for operating brake system 1 will be explained by way of example in further detail, on the basis of the flow chart that is depicted in FIG. 2.

In a first step 25 a collision is initially detected, causing the advantageous method to be started. In the next step 26, the functioning of wheels 2 through 5 is checked on the basis of rotational sensor signals, as described above. If an implausible wheel is found, subsequent step 27 checks whether the implausible wheel is a wheel that was struck during the collision. To that end, data concerning the point of impact are collected or determined from the collision detection system in a step 28, which are compared in step 27 to the data relating to the implausible wheel. If the implausible wheel matches the ascertained point of impact, the corresponding brake line is identified as suspicious. The subsequent step 29 checks whether there is an unexpected pressure drop in the suspicious brake line.

The unexpected pressure drop may be detected in a first exemplary embodiment, with the aid of pressure sensors 20 through 23 depicted in FIG. 1. To that end, the pressure actually present in the respective brake line 11 through 13 is detected with the aid of sensors 20 through 23, and is compared to an expected pressure. This takes place in control unit 24. The expected pressure is advantageously determined by control unit 24, as a function of the pumping capacity of pump unit 15. If the pressure difference exceeds a predefinable threshold value, an unexpected pressure drop is diagnosed.

In a second exemplary embodiment, which undoubtedly may also be combined with the exemplary embodiment described above, an unexpected pressure drop is detected by comparing the instantaneous actual power consumption of the pump unit to an expected setpoint power consumption. Pressure sensors 20 through 23 may be dispensed with in this case. The pump unit draws less current when there is a break in one of brake lines 10 through 13, due to the absence of counterpressure in the brake line or the corresponding brake circuit. Thus it is possible, by comparing the setpoint power consumption to the actual power consumption, to detect an unexpectedly low pump flow, which makes it possible to conclude that there is a defect in one of brake lines 10 through 13 (or the corresponding brake circuit) and/or in the corresponding valve.

In a step 30, the reference data described above (setpoint power consumption and/or expected pressure) are detected, and compared in step 29 to the data actually existing (actual power consumption or pressure actually present).

The fewer the number of other (unknown) factors influencing the resistance of the pump unit, the more readily a defect in a brake line 10 through 13 may be recognized in the power consumption of the pump unit. For this reason, it is provided to perform selected sequences of tests. To this end, for a short time period only the valve of valves 16 through 19 which is assigned to the suspicious wheel identified in step 27 is opened first, and all other valves are closed. If wheel 2, for example, was identified after the collision as an implausible wheel and was verified on the basis of the point of impact determined in step 28, then valve 16 is opened and valves 17 through 19 are closed, so that only brake line 10 and wheel brake 6 have an influence on the actual power consumption of pump unit 15. The resistance, which is measured in the form of the power consumption of pump unit 15, then results from the pressure buildup or non-buildup at the suspicious wheel 2. If there is suspicion of a brake line defect at more than one of wheels 2 through 5 or wheel brakes 6 through 9, then the method just described may be performed sequentially for the individual wheels 2 through 5 (or brake lines 10 through 13). Correspondingly, the method may naturally also be carried out additionally or alternatively while detecting the unexpected pressure drop with the aid of pressure sensors 20 through 23. If too low a power consumption appears for all wheels or brake lines, then the defect is not in the brake lines but, for example, in the pump unit, with the result that the brake system advantageously continues to be operated as before.

If the method described above and the comparison of the pressure values or the power consumption values leads in step 29 to the conclusion that there has been an unexpected pressure drop, then finally the valve of the corresponding brake line is closed in a step 31. After the conclusion of the described diagnostic procedure, the remaining (intact) valves are naturally opened again, so that the remaining wheels or wheel brakes may be used to brake the wheels. If no unexpected pressure drop is detected in step 29, it is assumed that the brake line is intact. Accordingly, in a step 32, valves 16 through 19 are kept open or are opened, and the automatic brake application is carried out with all intact wheel brakes 6 through 9.

As an alternative to the collision detection system, which uses data from an airbag control unit, other arrangements may naturally also be used in particular to detect the point of impact, such as, for example, optical, radar, or ultrasound sensors. Advantageously, the wheel identified as implausible and affected by the collision, i.e., the suspicious wheel or the suspicious wheel brake or brake line, is separated from the brake system already in step 27 by closing the corresponding valve, in order to prevent a possible loss of brake fluid as quickly as possible. The valve is then reopened only to detect an unexpected pressure drop.

Naturally, the described method may be carried out not only following a detected collision, but also at any point in time. It is particularly advantageous to carry out the method during or after every start-up of the motor vehicle or a start-up of the brake system.

All in all, with the aid of the described method and the described brake system a defect may be detected in one of the brake lines, for example as a detached brake line, as well as in one of the valves, for example as leakage, or else in the pump unit.

What is claimed is:

1. A method for operating a hydraulically working brake system of a motor vehicle, comprising:
  assigning a plurality of brake lines, each brake line being assigned to a respective wheel brake;
  connecting each brake line via a respective switchable valve to the high pressure side of a pump unit for brake fluid;
  identifying one of the brake lines as suspicious based on data indicating that the suspicious brake line has been potentially damaged by a detected collision;

responsive to the identifying, confirming that the suspicious brake line is actually damaged by detecting a pressure in the suspicious brake line; and
closing the valve of the suspicious brake line when an unexpected pressure drop is detected in the suspicious brake line;
wherein to detect the unexpected pressure drop, an instantaneous actual power consumption of the pump unit is compared to an expected setpoint power consumption, the unexpected pressure drop being detected when the comparison indicates that the instantaneous actual power consumption is unexpectedly low.

2. The method of claim 1, wherein a pressure sensor is used to detect, independently of the detection based on the instantaneous actual power consumption, the unexpected pressure drop in the suspicious brake line as compared to an expected pressure, such that either comparison is individually sufficient to detect the unexpected pressure drop.

3. The method of claim 2, wherein the expected pressure is determined as a function of the capacity of the pump unit.

4. The method of claim 1, wherein to detect an unexpected pressure drop in the suspicious brake line, a valve of the suspicious brake line is opened and valves of the remainder of the plurality of brake lines are closed.

5. The method of claim 1, wherein the data indicating that the suspicious brake line has been potentially damaged is obtained from a collision detection system of the vehicle.

6. The method of claim 1, further comprising:
identifying a point of impact for the detected collision;
identifying an implausible wheel based on wheel sensor data;
comparing a location of the implausible wheel to the point of impact;
identifying the suspicious brake line as being the brake line which is assigned to the wheel brake of the implausible wheel when the comparing indicates that the location of the implausible wheel and the point of impact are the same.

7. The method of claim 1, further comprising:
responsive to detecting the collision, and after confirming that the suspicious brake line is actually damaged, applying an automatic brake to bring the vehicle to a standstill.

8. The method of claim 1, further comprising:
calculating the expected setpoint power consumption as a function of a capacity of the pump unit and a stored counterpressure consumption characteristic that gives a typical power consumption of the pump unit during active pressure buildup when the brake line is intact.

9. A brake system for a motor vehicle, comprising:
a plurality of brake lines, each of which is assigned to a respective wheel brake, each brake line being connected via a respective switchable valve to a high pressure side of a pump unit for brake fluid;
a detecting and closing arrangement configured to perform the following:
identifying one of the brake lines as suspicious based on data indicating that the suspicious brake line has been potentially damaged by a detected collision;
responsive to the identifying, confirming that the suspicious brake line is actually damaged by detecting an unexpected pressure drop in the suspicious brake line; and
closing the switchable valve of the suspicious brake line when the unexpected pressure drop is detected;
wherein to detect the unexpected pressure drop, an instantaneous actual power consumption of the pump unit is compared to an expected setpoint power consumption, the unexpected pressure drop being detected when the comparison indicates that the instantaneous actual power consumption is unexpectedly low.

10. The brake system of claim 9, wherein the detecting and closing arrangement includes at least one of a plurality of pressure sensors, each sensor respectively assigned to one of the plurality of brake lines, a device for ascertaining the instantaneous power consumption of the pump unit, and a collision detection system.

11. The brake system of claim 9, wherein the detecting and closing arrangement is configured to perform:
identifying a point of impact for the detected collision;
identifying an implausible wheel based on wheel sensor data;
comparing a location of the implausible wheel to the point of impact; and
identifying the suspicious brake line as being the brake line which is assigned to the wheel brake of the implausible wheel when the comparing indicates that the location of the implausible wheel and the point of impact are the same;
wherein the wheel sensor data is obtained from rotational speed sensors that monitor rotational speeds of the wheels, and the implausible wheel is identified by determining based on the wheel sensor data that one of the wheels has become detached.

12. A control unit, comprising:
a detecting and closing arrangement configured to perform the following for a vehicle in which a plurality of brake lines are each assigned to a respective wheel brake, each brake line being connected via a respective switchable valve to a high pressure side of a pump unit for brake fluid:
identifying one of the brake lines as suspicious based on data indicating that the suspicious brake line has been potentially damaged by a detected collision;
responsive to the identifying, confirming that the suspicious brake line is actually damaged by detecting an unexpected pressure drop in the suspicious brake line; and
closing a switchable valve of the suspicious brake line when the unexpected pressure drop is detected;
wherein to detect the unexpected pressure drop, an instantaneous actual power consumption of the pump unit is compared to an expected setpoint power consumption, the unexpected pressure drop being detected when the comparison indicates that the instantaneous actual power consumption is unexpectedly low.

13. The control unit of claim 12, wherein the detecting and closing arrangement is configured to perform:
identifying a point of impact for the detected collision;
identifying an implausible wheel based on wheel sensor data;
comparing a location of the implausible wheel to the point of impact; and
identifying the suspicious brake line as being the brake line which is assigned to the wheel brake of the implausible wheel when the comparing indicates that the location of the implausible wheel and the point of impact are the same;
wherein the wheel sensor data is obtained from rotational speed sensors that monitor rotational speeds of the wheels, and the implausible wheel is identified by determining based on the wheel sensor data that one of the wheels has become detached.

14. A method for operating a hydraulically working brake system of a motor vehicle, comprising:
- assigning a plurality of brake lines, each brake line being assigned to a respective wheel brake;
- connecting each brake line via a respective switchable valve to the high pressure side of a pump unit for brake fluid;
- identifying one of the brake lines as suspicious based on data indicating that the suspicious brake line has been potentially damaged by a detected collision;
- responsive to the identifying, confirming that the suspicious brake line is actually damaged by detecting a pressure in the suspicious brake line;
- closing the valve of the suspicious brake line when an unexpected pressure drop is detected in the suspicious brake line;
- wherein to detect the unexpected pressure drop, an instantaneous actual power consumption of the pump unit is compared to an expected setpoint power consumption;
- identifying a point of impact for the detected collision;
- identifying an implausible wheel based on wheel sensor data;
- comparing a location of the implausible wheel to the point of impact; and
- identifying the suspicious brake line as being the brake line which is assigned to the wheel brake of the implausible wheel when the comparing indicates that the location of the implausible wheel and the point of impact are the same;
- wherein the wheel sensor data is obtained from rotational speed sensors that monitor rotational speeds of the wheels, and the implausible wheel is identified by determining based on the wheel sensor data that one of the wheels has become detached.

15. A method for identifying a suspicious brake line in a hydraulically working brake system of a motor vehicle, comprising:
- identifying one of a plurality of brake lines as suspicious based on data indicating that the suspicious brake line has been potentially damaged by a detected collision, by performing the following:
  - identifying a point of impact for the detected collision;
  - identifying an implausible wheel based on wheel sensor data;
  - comparing a location of the implausible wheel to the point of impact; and
  - identifying the suspicious brake line as being the brake line which is assigned to the wheel brake of the implausible wheel when the comparing indicates that the location of the implausible wheel and the point of impact are the same;
  - wherein the wheel sensor data is obtained from rotational speed sensors that monitor rotational speeds of the wheels, and the implausible wheel is identified by determining based on the wheel sensor data that one of the wheels has become detached; and
- responsive to the identifying of the suspicious brake line, confirming that the suspicious brake line is actually damaged by detecting a pressure in the suspicious brake line.

* * * * *